United States Patent
Ambady et al.

(10) Patent No.: US 12,502,419 B2
(45) Date of Patent: Dec. 23, 2025

(54) CHIMERIC PROTEINS FOR SELECTIVE LYSIS OF BACTERIA

(71) Applicants: Bactoclear Holdings PTE. LTD., Singapore (SG); Anisha Ambady, Bangalore (IN)

(72) Inventors: Anisha Ambady, Bangalore (IN); Vivek Daniel Paul, Bangalore (IN); R. Sanjeev Saravanan, Bengaluru (IN)

(73) Assignees: Bactoclear Holdings PTE. LTD., Singapore (SG); Anisha Ambady, Bangalore (IN)

( * ) Notice: Subject to any disclaimer, the term of this patent is extended or adjusted under 35 U.S.C. 154(b) by 708 days.

(21) Appl. No.: 17/773,301

(22) PCT Filed: Oct. 30, 2020

(86) PCT No.: PCT/IN2020/050918
§ 371 (c)(1),
(2) Date: Apr. 29, 2022

(87) PCT Pub. No.: WO2021/084558
PCT Pub. Date: May 6, 2021

(65) Prior Publication Data
US 2022/0378884 A1    Dec. 1, 2022

(30) Foreign Application Priority Data
Oct. 31, 2019   (IN) .............. 201941044142

(51) Int. Cl.
*C12N 15/86* (2006.01)
*A61K 38/48* (2006.01)
*A61P 31/04* (2006.01)
*C12N 9/52* (2006.01)

(52) U.S. Cl.
CPC .......... *A61K 38/4886* (2013.01); *A61P 31/04* (2018.01); *C12N 9/52* (2013.01); *C12N 15/86* (2013.01); *C12Y 304/24075* (2013.01); *C12N 2795/10143* (2013.01)

(58) Field of Classification Search
CPC ...... A61K 38/4886; C12N 15/86; C12N 9/78; C12Y 304/24075; C07K 2319/00
See application file for complete search history.

(56) References Cited

U.S. PATENT DOCUMENTS

| 2014/0286904 A1 | 9/2014 | Ross et al. |
| 2015/0290209 A1 | 10/2015 | Gallo et al. |
| 2017/0318817 A1 | 11/2017 | Padmanabhan et al. |

OTHER PUBLICATIONS

Severn et al. The Ubiquitous Human Skin Commensal *Staphylococcus hominis* Protects against Opportunistic Pathogens. mBio. May 24, 2022;13(3):e00930-22.*
International Search Report in PCT/IN2020/050918, mailed Jul. 16, 2021.
Kusuma et al. Comparison of four methods for determining lysostaphin susceptibility of various strains of *Staphylococcus aureus*. Antimicrobial agents and chemotherapy. Aug. 2005;49(8):3256-63.
Nakatsuji et al.. Antimicrobials from human skin commensal bacteria protect against *Staphylococcus aureus* and are deficient in atopic dermatitis. Science translational medicine. Feb. 22, 2017;9(378):eaah4680.

* cited by examiner

*Primary Examiner* — Lynn Y Fan
(74) *Attorney, Agent, or Firm* — Seed IP Law Group LLP

(57) ABSTRACT

The present invention provides chimeric ectolysins useful for selective suppression of certain targeted bacterial species while having little to no effect on closely related non-targeted bacterial species. Specifically, the disclosure provides polypeptides for selective suppression of growth of *Staphylococcus aureus* and/or *S. hominis* but not *S. epidermidis*. Compositions and methods for selective suppression of target bacterial species are also provided.

17 Claims, 4 Drawing Sheets
Specification includes a Sequence Listing.

SEQUENCE LISTING

<160> NUMBER OF SEQ ID NOS: 9

<210> SEQ ID NO 1
<211> LENGTH: 100
<212> TYPE: PRT
<213> ORGANISM: Artificial Sequence
<220> FEATURE:
<223> OTHER INFORMATION: Amino acid sequence of P128

<400> SEQUENCE: 1

Lys Leu Glu Thr Pro Asn Thr Gly Trp Lys Thr Asn Lys Tyr Gly Thr
1               5                   10                  15

Leu Tyr Lys Ser Glu Ser Ala Ser Phe Thr Pro Asn Thr Asp Ile Ile
            20                  25                  30

Thr Arg Thr Thr Gly Pro Phe Arg Ser Met Pro Gln Ser Gly Val Leu
        35                  40                  45

Lys Ala Gly Gln Thr Ile His Tyr Asp Glu Val Met Lys Gln Asp Gly
50                  55                  60

His Val Trp Val Gly Tyr Thr Gly Asn Ser Gly Gln Arg Ile Tyr Leu
65                  70                  75                  80

Pro Val Arg Thr Trp Asn Lys Ser Thr Asn Thr Leu Gly Val Leu Trp
                85                  90                  95

Gly Thr Ile Lys
            100

<210> SEQ ID NO 2
<211> LENGTH: 115
<212> TYPE: PRT
<213> ORGANISM: Artificial Sequence
<220> FEATURE:
<223> OTHER INFORMATION: Amino acid sequence of P552

<400> SEQUENCE: 2

Met Ser Ser Ala Ile Gly Lys Asn Ala Leu Phe Ile Tyr Asp Lys Lys
1               5                   10                  15

Leu Asp Thr Pro Asn Thr Gly Trp Lys Thr Asn Lys Tyr Gly Thr Leu
            20                  25                  30

Tyr Lys Ser Glu Ser Ala Ser Phe Thr Pro Asn Thr Asp Ile Ile Thr
        35                  40                  45

Arg Thr Thr Gly Pro Phe Arg Ser Met Pro Gln Ser Gly Val Leu Lys
    50                  55                  60

Ala Gly Gln Thr Ile His Tyr Asp Glu Val Met Lys Gln Asp Gly His
65                  70                  75                  80

Val Trp Val Gly His Thr Gly Asn Ser Gly Gln Arg Ile Tyr Leu Pro
                85                  90                  95

Val Arg Thr Trp Asn Lys Ser Thr Asn Thr Leu Gly Val Leu Trp Gly
                100                 105                 110

Thr Ile Lys
        115

<210> SEQ ID NO 3
<211> LENGTH: 360
<212> TYPE: DNA
<213> ORGANISM: Artificial Sequence
<220> FEATURE:
<223> OTHER INFORMATION: DNA sequence of P552

<400> SEQUENCE: 3
atgtctttag attcacttaa gaagtataac ggcaaacttc ctaagcatga cccaagtttt      60

```
gtacaacctg gtaaccgaca ttataagtat cagtgtacat ggtatgctta taatagaaga    120
ggtcaattag gcatacctgt gcctttatgg ggggacgccg ccgactggat aggtggtgct    180
gaaggagcag gttatggcgt aggtagaaca cctaaacaag gtgcttgtgt tatatggcaa    240
agaggagttc aaggaggtag cccacaatat ggtcacgtag cgtttgtaga gaaagtatta    300
gatggaggta aaaaaatatt tatctctgaa cataactatg ctaccccta atggatatggt     360
```

<210> SEQ ID NO 4
<211> LENGTH: 279
<212> TYPE: PRT
<213> ORGANISM: Artificial Sequence
<220> FEATURE:
<223> OTHER INFORMATION: Amino acid sequence of P158

<400> SEQUENCE: 4

Met Gly Gly Leu Met Gly Glu Asp Thr Ser Lys Glu Leu Lys Glu Lys
1               5                   10                  15

Gly Val Ala Glu Lys Gln Ser Ser Gly Asp Lys Asp Gly Gly Ser Asp
            20                  25                  30

Ser Gly Gly Ala Gln Asp Gly Gly Ser Leu Asp Ser Leu Lys Lys Tyr
        35                  40                  45

Asn Gly Lys Leu Pro Lys His Asp Pro Ser Phe Val Gln Pro Gly Asn
    50                  55                  60

Arg His Tyr Lys Tyr Gln Cys Thr Trp Tyr Ala Tyr Asn Arg Arg Gly
65                  70                  75                  80

Gln Leu Gly Ile Pro Val Pro Leu Trp Gly Asp Ala Ala Asp Trp Ile
                85                  90                  95

Gly Gly Ala Lys Gly Ala Gly Tyr Gly Val Gly Arg Thr Pro Lys Gln
            100                 105                 110

Gly Ala Cys Val Ile Trp Gln Arg Gly Val Gln Gly Gly Ser Pro Gln
        115                 120                 125

Tyr Gly His Val Ala Phe Val Glu Lys Val Leu Asp Gly Gly Lys Lys
    130                 135                 140

Ile Phe Ile Ser Glu His Asn Tyr Ala Thr Pro Asn Gly Tyr Gly Thr
145                 150                 155                 160

Arg Thr Ile Asp Met Ser Ser Ala Ile Gly Lys Asn Ala Gln Phe Ile
                165                 170                 175

Tyr Asp Lys Lys Leu Glu Thr Pro Asn Thr Gly Trp Lys Thr Asn Lys
            180                 185                 190

Tyr Gly Thr Leu Tyr Lys Ser Glu Ser Ala Ser Phe Thr Pro Asn Thr
        195                 200                 205

Asp Ile Ile Thr Arg Thr Thr Gly Pro Phe Arg Ser Met Pro Gln Ser
    210                 215                 220

Gly Val Leu Lys Ala Gly Gln Thr Ile His Tyr Asp Glu Val Met Lys
225                 230                 235                 240

Gln Asp Gly His Val Trp Val Gly Tyr Thr Gly Asn Ser Gly Gln Arg
                245                 250                 255

Ile Tyr Leu Pro Val Arg Thr Trp Asn Lys Ser Thr Asn Thr Leu Gly
            260                 265                 270

Val Leu Trp Gly Thr Ile Lys
        275

<210> SEQ ID NO 5
<211> LENGTH: 840
<212> TYPE: DNA
<213> ORGANISM: Artificial Sequence
<220> FEATURE:
<223> OTHER INFORMATION: DNA sequence of P158

<400> SEQUENCE: 5

```
atgggaggtc ttatgggtga agatacttct aaagaactta agaaaaagg tgtagcagag     60
aaacaaagta gtggagataa agatggtggt tctgatagtg gtggagctca agatggtggc    120
tctttagatt cacttaaaaa atataacggc aaacttccta agcatgaccc aagttttgtt    180
caacctggta accgacatta taagtatcag tgtacatggt atgcttataa agaagaggt     240
caattaggca tacctgtgcc tttatggggg gacgccgccg actggatagg tggtgctaaa    300
ggagcaggtt atggtgtagg tagaacacct aaacaaggtg cttgtgttat atggcaaaga    360
ggagttcaag gaggtagccc acaatatggt cacgtagcgt ttgtagagaa agtattagat    420
ggaggtaaaa aaatatttat ctctgaacat aactatgcta cccctaatgg atatggtact    480
agaacgatag atatgagttc agccataggt aagaatgcac aattcattta cgataagaaa    540
ctcgagacgc cgaatacagg ttggaaaaca aacaaatatg gcacactata taaatcagag    600
tcagctagct tcacacctaa tacagatata ataacaagaa cgactggtcc atttagaagc    660
atgccgcagt caggagtctt aaaagcaggt caaacaattc attatgatga agtgatgaaa    720
caagacggtc atgtttgggt aggttataca ggtaacagtg ccaacgtat ttacttgcct     780
gtaagaacat ggaataaatc tactaatact ttaggtgttc tttggggaac tataaagtga    840
```

<210> SEQ ID NO 6
<211> LENGTH: 279
<212> TYPE: PRT
<213> ORGANISM: Artificial Sequence
<220> FEATURE:
<223> OTHER INFORMATION: Amino acid sequence of P751

<400> SEQUENCE: 6

```
Met Gly Gly Leu Met Gly Glu Asp Thr Ser Lys Glu Leu Lys Glu Lys
1               5                   10                  15
Gly Val Ala Glu Lys Gln Ser Ser Gly Asp Lys Asp Gly Ala Ser Asp
            20                  25                  30
Ser Gly Ala Ala Gln Asp Gly Ala Ser Leu Asp Ser Leu Lys Lys Tyr
        35                  40                  45
Asn Gly Lys Leu Pro Lys His Asp Pro Ser Phe Val Gln Pro Gly Asn
    50                  55                  60
Arg His Tyr Lys Tyr Gln Cys Thr Trp Tyr Ala Tyr Asn Arg Arg Gly
65                  70                  75                  80
Gln Leu Gly Ile Pro Val Pro Leu Trp Gly Asp Ala Ala Asp Trp Ile
                85                  90                  95
Gly Gly Ala Lys Gly Ala Gly Tyr Gly Val Gly Arg Thr Pro Lys Gln
            100                 105                 110
Gly Ala Cys Val Ile Trp Gln Arg Gly Val Gln Gly Ser Pro Gln
        115                 120                 125
Tyr Gly His Val Ala Phe Val Glu Lys Val Leu Asp Gly Gly Lys Lys
    130                 135                 140
Ile Phe Ile Ser Glu His Asn Tyr Ala Thr Pro Asn Gly Tyr Gly Thr
145                 150                 155                 160
Arg Thr Ile Asp Met Ser Ser Ala Ile Gly Lys Asn Ala Gln Phe Ile
                165                 170                 175
Tyr Asp Lys Lys Leu Glu Thr Pro Asn Thr Gly Trp Lys Thr Asn Lys
            180                 185                 190
```

```
Tyr Gly Thr Leu Tyr Lys Ser Glu Ser Ala Ser Phe Thr Pro Asn Thr
            195                 200                 205

Asp Ile Ile Thr Arg Thr Thr Gly Pro Phe Arg Ser Met Pro Gln Ser
210                 215                 220

Gly Val Leu Lys Ala Gly Gln Thr Ile His Tyr Asp Glu Val Met Lys
225                 230                 235                 240

Gln Asp Gly His Val Trp Val Gly Tyr Thr Gly Asn Ser Gly Gln Arg
                245                 250                 255

Ile Tyr Leu Pro Val Arg Thr Trp Asn Lys Ser Thr Asn Thr Leu Gly
                260                 265                 270

Val Leu Trp Gly Thr Ile Lys
            275
```

<210> SEQ ID NO 7
<211> LENGTH: 355
<212> TYPE: DNA
<213> ORGANISM: Artificial Sequence
<220> FEATURE:
<223> OTHER INFORMATION: DNA sequence of P751

<400> SEQUENCE: 7

```
atgggaggtc ttatgggtga agatacttct aaagaactta agaaaaaagg tgtagcagag     60
aaacaaagta gtggagataa agatggtgct tctgatagtg gtgcagctca agatggtgcc    120
tctttagatt cacttaaaaa atataacggc aaacttccta agcatgaccc aagttttgtt    180
caacctggta accgacatta taagtatcag tgtacatggt atgcttataa tagaagaggt    240
caattaggca tacctgtgcc tttatggggg gacgccgccg actggatagg tggtgctaaa    300
ggagcaggtt atggtgtagg tagaacacct aaacaaggtg cttgtgttat atggc         355
```

<210> SEQ ID NO 8
<211> LENGTH: 279
<212> TYPE: PRT
<213> ORGANISM: Artificial Sequence
<220> FEATURE:
<223> OTHER INFORMATION: Amino acid sequence of P752

<400> SEQUENCE: 8

```
Met Gly Gly Leu Met Gly Glu Asp Thr Ser Lys Glu Leu Lys Glu Lys
1               5                   10                  15

Gly Val Ala Glu Lys Gln Ser Ser Gly Asp Lys Asp Gly Ala Ser Asp
            20                  25                  30

Ser Gly Ala Ala Gln Asp Gly Ala Ser Leu Asp Ser Leu Lys Lys Tyr
        35                  40                  45

Asn Gly Lys Leu Pro Lys His Asp Pro Ser Phe Val Gln Pro Gly Asn
    50                  55                  60

Arg His Tyr Lys Tyr Gln Cys Thr Trp Tyr Ala Tyr Asn Arg Arg Gly
65                  70                  75                  80

Gln Leu Gly Ile Pro Val Pro Leu Trp Gly Asp Ala Ala Asp Trp Ile
                85                  90                  95

Gly Gly Ala Lys Gly Ala Gly Tyr Gly Val Gly Arg Thr Pro Lys Gln
            100                 105                 110

Gly Ala Cys Val Ile Trp Gln Arg Gly Val Gln Gly Ser Pro Glu
        115                 120                 125

Tyr Gly His Val Ala Phe Val Glu Lys Val Leu Asp Gly Gly Lys Lys
    130                 135                 140

Ile Phe Ile Ser Glu His Asn Tyr Ala Thr Pro Asn Gly Tyr Gly Thr
145                 150                 155                 160
```

```
Arg Thr Ile Asp Met Ser Ser Ala Ile Gly Lys Asn Ala Gln Phe Ile
                165                 170                 175
Tyr Asp Lys Lys Leu Glu Thr Pro Asn Thr Gly Trp Lys Thr Asn Lys
            180                 185                 190
Tyr Gly Thr Leu Tyr Lys Ser Glu Ser Ala Ser Phe Thr Pro Asn Thr
            195                 200                 205
Asp Ile Ile Thr Arg Thr Thr Gly Pro Phe Arg Ser Met Pro Gln Ser
        210                 215                 220
Gly Val Leu Lys Ala Gly Gln Thr Ile His Tyr Asp Glu Val Met Lys
225                 230                 235                 240
Gln Asp Gly His Val Trp Val Gly Tyr Thr Gly Asn Ser Gly Gln Arg
                245                 250                 255
Ile Tyr Leu Pro Val Arg Thr Trp Asn Lys Ser Thr Asn Thr Leu Gly
                260                 265                 270
Val Leu Trp Gly Thr Ile Lys
        275

<210> SEQ ID NO 9
<211> LENGTH: 360
<212> TYPE: DNA
<213> ORGANISM: Artificial Sequence
<220> FEATURE:
<223> OTHER INFORMATION: DNA sequence of P752

<400> SEQUENCE: 9
atgggaggtc ttatgggtga agatacttct aaagaactta agaaaaagg tgtagcagag      60 aaacaaagta gtggagataa agatggtgct tctgatagtg gtgcagctca agatggtgcc    120
tctttagatt cacttaaaaa atataacggc aaacttccta agcatgaccc aagtttttgtt   180 caacctggta accgacatta taagtatcag tgtacatggt atgcttataa tagaagaggt    240
caattaggca tacctgtgcc tttatggggg gacgccgccg actggatagg tggtgctaaa    300
ggagcaggtt atggtgtagg tagaacacct aaacaaggtg cttgtgttat atggcaaaga    360
```

CHIMERIC PROTEINS FOR SELECTIVE LYSIS OF BACTERIA

REFERENCE TO SUBMISSION OF A SEQUENCE LISTING AS A TEXT FILE

The Sequence Listing written in file 1316554-Sequence-Listing.txt created on Apr. 24, 2022, 12,892 bytes, machine format IBM-PC, MS-Windows operating system, is hereby incorporated by reference in its entirety for all purposes.

BACKGROUND OF THE INVENTION

As first disclosed in WO2007/130655, phage-derived chimeric ectolysins can act as broad-spectrum anti-Staphylococcal proteins that kill members of the diverse family of Staphylococci, including the coagulase-positive *Staphylococcus aureus* and other coagulase-negative Staphylococci (CoNS). The chimeric protein termed P128, which is described in detail in WO2007/130655, is an exemplary ectolysin of this nature. Bacteria of the *Staphylococcus* spp., especially the CoNS, have the ability to colonize medical devices and under permissive conditions behave as a pathogen causing serious bloodstream infections. The broad antistaphylococcal property of P128 is particularly useful for treating the systemic infections caused by these groups of bacteria.

The increased recognition of the role of the human microbiome has prompted the search for chemicals/antibacterials that have minimum effect on the healthy microbiome. This is best exemplified in topical applications for skin indications where it is advantageous to maintain the normal skin microbiome, especially the beneficial skin flora such as *S. epidermidis* to prevent dysbiosis, and selectively eliminate only the problematic bacteria such as *S. aureus*. *S. epidermidis*, specifically, is a very important member of the skin microbiome where it not only prevents colonization of pathogenic *S. aureus* but also benefits skin immune function by reducing inflammation after injury, enhancing development of cutaneous T cells and promoting expression of host antimicrobial peptides. Therefore, targeted medication for the use as skin applications to remove problematic bacteria without perturbing beneficial Staphylococci on the skin is of high value.

The present inventors constructed a library of chimeric anti-staphylococcal lysins, which include variants of P128 that harbor the catalytic Cysteine Histidine-dependent aminohydrolase/peptidase (CHAP) domain and the targeting Sh3b domain from lysostaphin. Both these functional domains are essential for antibacterial activity and are retained in all variants described here. The first step for finding selective lysins is to develop a screening assay; using this assay the inventors screened for lysins in the library that are selective for pathogen only. This invention thus provides novel compositions and methods that allow for selective suppression of certain bacterial species, especially those in the Staphylococci genus, without significant negative impact on other closely related bacterial species.

BRIEF SUMMARY OF THE INVENTION

WO2007/130655 provides chimeric polypeptides useful in suppressing growth of bacteria, including in situations involving bacterial infections. Among the chimeric polypeptides, some are fusion proteins comprising at least a portion of the protein encoded by orf56 of the staphylococcal myovirus K, which provides muralytic activity, and at least a portion of the non-catalytic cell-wall binding domain (CBD) of the lytic Staphylococcal bacteriocin, lysostaphin, which provides target bacterial cell binding activity. This application provides the first disclosure of the use of chimeric polypeptides derived from those initially disclosed in WO2007/130655, including some mutants or variants, for the selective suppression of growth of certain bacterial species belongs to genus *Staphylococcus*, such as *S. aureus* or *S. hominis*, but not other bacterial species belonging to the same genus, such as *S. epidermidis*.

As such, in a first aspect, this invention provides new chimeric polypeptides that are capable of selective suppressing the growth of certain target bacterial species while not affecting the non-target bacterial species within the same genus. The chimeric polypeptide may comprise the amino acid sequence of SEQ ID NO:2, 6, or 8. In some embodiments, the polypeptide may consist of the amino acid sequence of SEQ ID NO:2, 6, or 8. For example, the polypeptide may comprise or may consist of the amino acid sequence of SEQ ID NO:2; the polypeptide may comprise or may consist of the amino acid sequence of SEQ ID NO:6; or the polypeptide may comprise or may consist of the amino acid sequence of SEQ ID NO:8. Also provided are compositions comprising (1) one or more of the polypeptides described above and herein, and (2) a physiologically acceptable excipient, such as one formulated for topical application.

This invention also provides the polynucleotide sequences encoding the chimeric polypeptides described above and herein, their corresponding expression cassettes, vectors, and host cells. In some embodiments, this invention provides a nucleic acid comprising a polynucleotide sequence encoding the polypeptide comprising or consisting of SEQ ID NO:2, 6, or 8. In some embodiments, this invention provides an expression cassette comprising such a polynucleotide sequence, or a vector comprising the expression cassette, or a host cell comprising the expression cassette or the vector described above or herein.

In some embodiments, a method is provided for recombinantly producing the polypeptide comprising or consisting of any one of SEQ ID NO:2, 6, or 8, the method comprising culturing the host cell comprising an expression cassette (such as a part of a vector) encoding such a polypeptide under conditions permitting the expression of the polypeptide encoded by the expression cassette or the vector.

In a second aspect, the present invention provides methods for specific suppression of target bacterial species without significant effect on other non-targeted bacterial species. For instance, the claimed method is for selectively suppressing growth of *S. aureus* and/or *S. hominis* but not *S. epidermidis*, and it involves a step of applying an effective amount of the polypeptide comprising or consisting of the amino acid sequence of SEQ ID NO:2, 4, 6, or 8 to a location where *S. aureus* or *S. hominis* is present and *S. epidermidis* is present, thereby suppressing the growth of *S. aureus* and/or *S. hominis* but not impacting the growth of *S. epidermidis*.

In some embodiments, the polypeptide is applied to a patient's skin. The polypeptides used in the claimed method may comprise or consist of SEQ ID NO:2; or the polypeptides used in the claimed method may comprise or consist of SEQ ID NO:4; or the polypeptides used in the claimed method may comprise or consist of SEQ ID NO:6; or the polypeptides used in the claimed method may comprise or consist of SEQ ID NO:8. In some embodiments, the polypeptide is applied to a patient's skin, for example, the polypeptide is applied in the form of a paste, cream, lotion, ointment, spray, or as an incorporated part of a patch/bandage or wound dressing.

In a related aspect, the present invention provides a new use of chimeric polypeptides, for example, the use of a polypeptide comprising or consisting of the amino acid sequence of SEQ ID NO:2, 4, 6, or 8 for selective suppression of growth of *S. aureus* and/or *S. hominis* but not *S. epidermidis*; or the use of a polypeptide comprising or consisting of the amino acid sequence of SEQ ID NO:2, 4, 6, or 8 for selective suppression of growth of *S. aureus* and/or *S. hominis* but not *S. epidermidis*. In some embodiments, the polypeptide comprises or consists of the amino acid sequence of SEQ ID NO:2 is used for selective suppression of growth of *S. aureus* and/or *S. hominis* but not *S. epidermidis*. In some embodiments, the polypeptide comprises or consists of the amino acid sequence of SEQ ID NO:2 is used for selective suppression of growth of *S. aureus* and/or *S. hominis* but not *S. epidermidis*. In some embodiments, the polypeptide comprises or consists of the amino acid sequence of SEQ ID NO:4 is used for selective suppression of growth of *S. aureus* and/or *S. hominis* but not *S. epidermidis*. In some embodiments, the polypeptide comprises or consists of the amino acid sequence of SEQ ID NO:6 is used for selective suppression of growth of *S. aureus* and/or *S. hominis* but not *S. epidermidis*. In some embodiments, the polypeptide comprises or consists of the amino acid sequence of SEQ ID NO:8 is used for selective suppression of growth of *S. aureus* and/or *S. hominis* but not *S. epidermidis*.

In a third aspect, the present invention provides a kit for selective suppression of target bacterial species without significantly affecting other related but non-targeted species. Typically, the kit for selective suppression of growth of *S. aureus* and/or *S. hominis* but not *S. epidermidis* comprises a first container containing a composition comprising an effective amount of a polypeptide comprising or consisting of the amino acid sequence of SEQ ID NO:2, 4, 6, or 8. In some embodiments, the polypeptide comprises or consists of the amino acid sequence of SEQ ID NO:2. In some embodiments, the polypeptide comprises or consists of the amino acid sequence of SEQ ID NO:4. In some embodiments, the polypeptide comprises or consists of the amino acid sequence of SEQ ID NO:6. In some embodiments, the polypeptide comprises or consists of the amino acid sequence of SEQ ID NO:8. In some embodiments, the composition is formulated for topical application, for example, in the form of a paste, cream, lotion, ointment, spray, or as an incorporated part of a patch/bandage, or wound dressing. In some embodiments, the kit further comprises a second container containing a skin care product. In some embodiments, the kit further comprises an instruction manual providing handling information for a user.

DEFINITIONS

Figure 1:
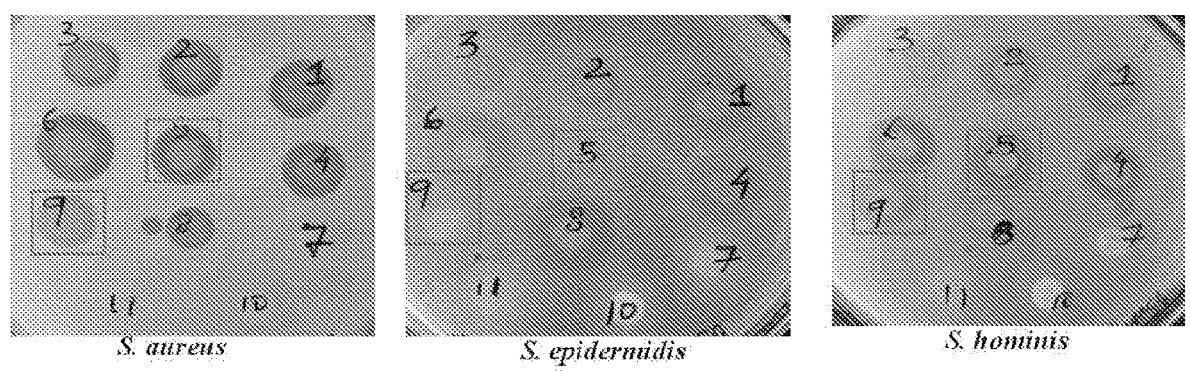
FIG. 1. Screening of different ectolysins for selectivity: the proteins in the respective spot numbers are as shown in Table 1.

The term "nucleic acid" or "polynucleotide" refers to deoxyribonucleic acids (DNA) or ribonucleic acids (RNA) and polymers thereof in either single- or double-stranded form. Unless specifically limited, the term encompasses nucleic acids containing known analogues of natural nucleotides that have similar binding properties as the reference nucleic acid and are metabolized in a manner similar to naturally occurring nucleotides. Unless otherwise indicated, a particular nucleic acid sequence also implicitly encompasses conservatively modified variants thereof (e.g., degenerate codon substitutions), alleles, orthologs, SNPs, and complementary sequences as well as the sequence explicitly indicated. Specifically, degenerate codon substitutions may be achieved by generating sequences in which the third position of one or more selected (or all) codons is substituted with mixed-base and/or deoxyinosine residues (Batzer et al., *Nucleic Acid Res.* 19:5081 (1991); Ohtsuka et al., *J. Biol. Chem.* 260:2605-2608 (1985); and Rossolini et al., *Mol. Cell. Probes* 8:91-98 (1994)). The term nucleic acid is used interchangeably with gene, cDNA, and mRNA encoded by a gene.

The term "gene" means the segment of DNA involved in producing a polypeptide chain. It may include regions preceding and following the coding region (leader and trailer) as well as intervening sequences (introns) between individual coding segments (exons).

The term "amino acid" refers to naturally occurring and synthetic amino acids, as well as amino acid analogs and amino acid mimetics that function in a manner similar to the naturally occurring amino acids. Naturally occurring amino acids are those encoded by the genetic code, as well as those amino acids that are later modified, e.g., hydroxyproline, γ-carboxyglutamate, and O-phosphoserine. Amino acid analogs refers to compounds that have the same basic chemical structure as a naturally occurring amino acid, i.e., an α carbon that is bound to a hydrogen, a carboxyl group, an amino group, and an R group, e.g., homoserine, norleucine, methionine sulfoxide, methionine methyl sulfonium. Such analogs have modified R groups (e.g., norleucine) or modified peptide backbones, but retain the same basic chemical structure as a naturally occurring amino acid. "Amino acid mimetics" refers to chemical compounds having a structure that is different from the general chemical structure of an amino acid, but that functions in a manner similar to a naturally occurring amino acid.

There are various known methods in the art that permit the incorporation of an unnatural amino acid derivative or analog into a polypeptide chain in a site-specific manner, see, e.g., WO 02/086075.

Amino acids may be referred to herein by either the commonly known three letter symbols or by the one-letter symbols recommended by the IUPAC-IUB Biochemical Nomenclature Commission. Nucleotides, likewise, may be referred to by their commonly accepted single-letter codes.

"Conservatively modified variants" applies to both amino acid and nucleic acid sequences. With respect to particular nucleic acid sequences, "conservatively modified variants" refers to those nucleic acids that encode identical or essentially identical amino acid sequences, or where the nucleic acid does not encode an amino acid sequence, to essentially identical sequences. Because of the degeneracy of the genetic code, a large number of functionally identical nucleic acids encode any given protein. For instance, the codons GCA, GCC, GCG and GCU all encode the amino acid alanine. Thus, at every position where an alanine is specified by a codon, the codon can be altered to any of the corresponding codons described without altering the encoded polypeptide. Such nucleic acid variations are "silent variations," which are one species of conservatively modified variations. Every nucleic acid sequence herein that encodes a polypeptide also describes every possible silent variation of the nucleic acid. One of skill will recognize that each codon in a nucleic acid (except AUG, which is ordinarily the only codon for methionine, and TGG, which is ordinarily the only codon for tryptophan) can be modified to yield a functionally identical molecule. Accordingly, each silent variation of a nucleic acid that encodes a polypeptide is implicit in each described sequence.

As to amino acid sequences, one of skill will recognize that individual substitutions, deletions or additions to a nucleic acid, peptide, polypeptide, or protein sequence which alters, adds or deletes a single amino acid or a small percentage of amino acids in the encoded sequence is a "conservatively modified variant" where the alteration results in the substitution of an amino acid with a chemically similar amino acid. Conservative substitution tables providing functionally similar amino acids are well known in the art. Such conservatively modified variants are in addition to and do not exclude polymorphic variants, interspecies homologs, and alleles of the invention.

The following eight groups each contain amino acids that are conservative substitutions for one another:
1) Alanine (A), Glycine (G);
2) Aspartic acid (D), Glutamic acid (E);
3) Asparagine (N), Glutamine (Q);
4) Arginine (R), Lysine (K);
5) Isoleucine (I), Leucine (L), Methionine (M), Valine (V);
6) Phenylalanine (F), Tyrosine (Y), Tryptophan (W);
7) Serine (S), Threonine (T); and
8) Cysteine (C), Methionine (M)
(see, e.g., Creighton, Proteins, W. H. Freeman and Co., N. Y. (1984)).

Amino acids may be referred to herein by either their commonly known three letter symbols or by the one-letter symbols recommended by the IUPAC-IUB Biochemical Nomenclature Commission. Nucleotides, likewise, may be referred to by their commonly accepted single-letter codes.

In the present application, amino acid residues are numbered according to their relative positions from the left most residue, which is numbered 1, in an unmodified wild-type polypeptide sequence.

"Polypeptide," "peptide," and "protein" are used interchangeably herein to refer to a polymer of amino acid residues. All three terms apply to amino acid polymers in which one or more amino acid residue is an artificial chemical mimetic of a corresponding naturally occurring amino acid, as well as to naturally occurring amino acid polymers and non-naturally occurring amino acid polymers. As used herein, the terms encompass amino acid chains of any length, including full-length proteins, wherein the amino acid residues are linked by covalent peptide bonds.

The term "recombinant" when used with reference, e.g., to a cell, or a nucleic acid, protein, or vector, indicates that the cell, nucleic acid, protein or vector, has been modified by the introduction of a heterologous nucleic acid or protein or the alteration of a native nucleic acid or protein, or that the cell is derived from a cell so modified. Thus, for example, recombinant cells express genes that are not found within the native (non-recombinant) form of the cell or express native genes that are otherwise abnormally expressed, under expressed or not expressed at all.

A "promoter" is defined as an array of nucleic acid control sequences that direct transcription of a polynucleotide sequence. As used herein, a promoter includes necessary polynucleotide sequences near the start site of transcription, such as, in the case of a polymerase II type promoter, a TATA element. A promoter also optionally includes distal enhancer or repressor elements, which can be located as much as several thousand base pairs from the start site of transcription. A "constitutive" promoter is a promoter that is active under most environmental and developmental conditions. An "inducible" promoter is a promoter that is active under environmental or developmental regulation. The term "operably linked" refers to a functional linkage between a polynucleotide expression control sequence (such as a promoter, or array of transcription factor binding sites) and a second polynucleotide sequence, wherein the expression control sequence directs transcription of the polynucleotide sequence corresponding to the second sequence.

An "expression cassette" is a nucleic acid construct, generated recombinantly or synthetically, with a series of specified polynucleotide elements that permit transcription of a particular polynucleotide sequence in a host cell. An expression cassette may be part of a plasmid, viral genome, or nucleic acid fragment. Typically, an expression cassette includes a polynucleotide to be transcribed, operably linked to a promoter.

The term "heterologous" as used in the context of describing the relative location of two elements, refers to the two elements such as polynucleotide sequences (e.g., a promoter or a protein/polypeptide-encoding sequence) or polypeptide sequences (e.g., a chimeric ectolysin sequence selected from SEQ ID NOs:2, 4, 6, and 8 or another peptide sequence serving as a fusion partner with a chimeric ectolysin sequence) that are not naturally found in the same relative positions. Thus, a "heterologous promoter" of a gene refers to a promoter that is not naturally operably linked to that gene. Similarly, a "heterologous polypeptide" or "heterologous polynucleotide" to a chimeric ectolysin or its encoding sequence is one derived from an origin other than ORF56 of phage K and CBD of lysostaphin or derived from ORF56 or lysostaphin CBD gene but not naturally connected to any part of chimeric ectolysin in the same fashion. The fusion of a chimeric ectolysin (or its coding sequence) with a heterologous polypeptide (or polynucleotide sequence) should typically result in a longer polypeptide (or polynucleotide sequence) retaining the same biological activity, e.g., selective killing of targeted bacterial species.

The term "inhibit/inhibiting/inhibition" or "suppress/suppressing/suppression," as used herein, refers to any detectable negative effect on a target biological process, such as bacterial cell proliferation or bacterial cell presence. Typically, an inhibition is reflected in a decrease of at least 10%, 20%, 30%, 40%, or 50% in target process (e.g., the growth rate or level of a pertinent bacterium such as *S. aureus*) upon application of an inhibitory substance (e.g., any one of the chimeric enzymes set forth in SEQ ID NO:2, 4, 6, or 8), when compared to a control where the inhibitor is not applied.

The term "selective suppression," as used herein, refers to the ability of a chimeric ectolysin of this invention to specifically target a predetermined bacterial species (such as *S. aureus* or *S. hominis*) to negatively affect its growth rate and/or amount/level of bacteria presence in an area that has been exposed to a sufficient amount of the chimeric ectolysin, while having little to no detectable negative impact on the growth rate and/or amount/level of bacteria presence of a non-targeted bacterium (such as *S. epidermidis*) in the same treated area. Typically, to achieve a "selective suppression" the targeted bacterium must be suppressed in its growth rate to 1/10, 1/100, or 1/300, or 1/500, or 1/1000 or lower compared with the non-targeted bacterium when treated with the same level of a selective inhibitor.

The term "treat" or "treating," as used in this application, describes to an act that leads to the elimination, reduction, alleviation, reversal, or prevention or delay of onset or recurrence of any symptom of a relevant condition. In other words, "treating" a condition encompasses both therapeutic and prophylactic intervention against the condition.

The term "effective amount" as used herein refers to an amount of a given substance that is sufficient in quantity to produce a desired effect. For example, an effective amount of a chimeric ectolysin for suppressing the growth of a specific bacterial species such as S. aureus is the amount of the chimeric protein to achieve a decreased level (including to an undetectable level) of S. aureus in a sample taken from a recipient, who is given the chimeric enzyme for a condition involving the bacterium's presence, e.g., as reflected or measured in the type of samples from the recipient. An amount adequate to achieve an intended effect in the therapeutic context is defined as the "therapeutically effective dose." The dosing range varies with the nature of the therapeutic agent being administered and other factors such as the route of administration and the severity of a patient's condition.

As used herein, a "host cell" is a cell that contains an expression vector and supports the replication or expression of the expression vector. Host cells may be prokaryotic cells such as E. coli, or eukaryotic cells such as yeast, insect, amphibian, or mammalian cells such as CHO, HeLa and the like, e.g., cultured cells, explants, and cells in vivo.

As used herein, the term "about" denotes a range encompassing +/−10% of a pre-determined value. For example, "about 10" means a range of 9 to 11.

DETAILED DESCRIPTION OF THE INVENTION

I. Introduction

Previously, chimeric polypeptides possessing the activity of suppressing bacterial growth, especially for the genus of Staphylococcus, by way of lysis of targeted bacteria cell wall and therefore killing the bacteria have been disclosed, see, e.g., WO2007/130655. These chimeric polypeptides generally comprise the murein-degrading catalytic domain of ORF56 and the non-catalytic cell-wall binding domain (CBD) of the lytic Staphylococcal bacteriocin, lysostaphin.

The present inventors have constructed and identified chimeric polypeptides having the same general structural features, which possess highly unique and exceptionally valuable characteristics of selective lytic activities against certain target bacteria species within the genus of Staphylococcus while demonstrating little to virtually none of lytic activity against other bacterial species within the same genus. This disclosure relates to the compositions and methods of use based on these newly identified chimeric polypeptides with selective anti-bacterial activities.

II. Production of Chimeric Polypeptides

A. General Recombinant Technology

Basic texts disclosing general methods and techniques in the field of recombinant genetics include Sambrook and Russell, Molecular Cloning, A Laboratory Manual (3rd ed. 2001); Kriegler, Gene Transfer and Expression: A Laboratory Manual (1990); and Ausubel et al., eds., Current Protocols in Molecular Biology (1994).

For nucleic acids, sizes are given in either kilobases (kb) or base pairs (bp). These are estimates derived from agarose or acrylamide gel electrophoresis, from sequenced nucleic acids, or from published DNA sequences. For proteins, sizes are given in kilodaltons (kDa) or amino acid residue numbers. Proteins sizes are estimated from gel electrophoresis, from sequenced proteins, from derived amino acid sequences, or from published protein sequences.

Oligonucleotides that are not commercially available can be chemically synthesized, e.g., according to the solid phase phosphoramidite triester method first described by Beaucage & Caruthers, Tetrahedron Lett. 22: 1859-1862 (1981), using an automated synthesizer, as described in Van Devanter et. al., Nucleic Acids Res. 12: 6159-6168 (1984). Purification of oligonucleotides is performed using any art-recognized strategy, e.g., native acrylamide gel electrophoresis or anion-exchange HPLC as described in Pearson & Reanier, J. Chrom. 255: 137-149 (1983).

The sequence of a polynucleotide encoding a chimeric polypeptide and its variants can be verified after cloning or subcloning using, e.g., the chain termination method for sequencing double-stranded templates of Wallace et al., Gene 16: 21-26 (1981).

B. Cloning and Subcloning of Coding Sequences for Chimeric Polypeptides

Polynucleotide sequences encoding chimeric proteins can be determined based on their amino acid sequences (e.g., any one of SEQ ID NOs:2, 4, 6, and 8) and available information from earlier publications (e.g., WO2007/130655).

Upon acquiring a polynucleotide sequence encoding a chimeric polypeptide, the coding sequence can be modified as appropriate (e.g., adding a coding sequence for a heterologous tag, such as an affinity tag, for example, 6×His tag or GST tag; or further mutated) and then be subcloned into a vector, for instance, an expression vector, so that a recombinant chimeric polypeptide can be produced from the resulting construct, for example, after transfection and culturing host cells under conditions permitting recombinant protein expression directed by a promoter operably linked to the coding sequence.

C. Modification of Nucleic Acids for Preferred Codon Usage in a Host Organism

The polynucleotide sequence encoding a chimeric ectolysin polypeptide can be further altered to coincide with the preferred codon usage of a particular host. For example, the preferred codon usage of one strain of bacterial cells can be used to derive a polynucleotide that encodes a chimeric ectolysin of the invention and includes the codons favored by this strain. The frequency of preferred codon usage exhibited by a host cell can be calculated by averaging frequency of preferred codon usage in a large number of genes expressed by the host cell (e.g., calculation service is available from web site of the Kazusa DNA Research Institute, Japan). This analysis is preferably limited to genes that are highly expressed by the host cell.

At the completion of modification, the coding sequences are verified by sequencing and are then subcloned into an appropriate expression vector for recombinant production of the chimeric ectolysin polypeptides.

IV. Expression and Purification of Recombinantly Produced Polypeptides

Following verification of the coding sequence, the chimeric polypeptides of the present invention can be produced using routine techniques in the field of recombinant genetics, relying on the polynucleotide sequences encoding the polypeptides disclosed herein.

A. Expression Systems

To obtain high level expression of a nucleic acid encoding a chimeric ectolysin polypeptide of the present invention, one typically subclones a polynucleotide encoding the polypeptide into an expression vector that contains a strong promoter (typically heterologous, i.e., of non-phage origin) to direct transcription, a transcription/translation terminator and a ribosome binding site for translational initiation. Suitable bacterial promoters are well known in the art and described, e.g., in Sambrook and Russell, supra, and Ausubel et al., supra. Bacterial expression systems for expressing a recombinant polypeptide are available in, e.g., *E. coli, Bacillus* sp., *Salmonella*, and *Caulobacter*. Kits for such expression systems are commercially available. Eukaryotic expression systems for mammalian cells, yeast, and insect cells are well known in the art and are also commercially available. In one embodiment, the eukaryotic expression vector is an adenoviral vector, an adeno-associated vector, or a retroviral vector.

The promoter used to direct expression of a heterologous nucleic acid depends on the particular application. The promoter is optionally positioned about the same distance from the heterologous transcription start site as it is from the transcription start site in its natural setting. As is known in the art, however, some variation in this distance can be accommodated without loss of promoter function.

In addition to the promoter, the expression vector typically includes a transcription unit or expression cassette that contains all the additional elements required for the expression of the chimeric polypeptide in host cells. A typical expression cassette thus contains a promoter operably linked to the coding sequence and signals required for efficient polyadenylation of the transcript, ribosome binding sites, and translation termination. The nucleic acid sequence encoding the chimeric polypeptide may be linked to a cleavable signal peptide sequence to promote secretion of the recombinant polypeptide by the transformed cell. Such signal peptides include, among others, the signal peptides from tissue plasminogen activator, insulin, and neuron growth factor, and juvenile hormone esterase of *Heliothis virescens*. Additional elements of the cassette may include enhancers and, if genomic DNA is used as the structural gene, introns with functional splice donor and acceptor sites.

In addition to a promoter sequence, the expression cassette may also contain a transcription termination region downstream of the structural gene to provide for efficient termination. The termination region may be obtained from the same gene as the promoter sequence or may be obtained from different genes.

The particular expression vector used to transport the genetic information into the cell is not particularly critical. Any of the conventional vectors used for expression in eukaryotic or prokaryotic cells may be used. Standard bacterial expression vectors include plasmids such as pBR322 based plasmids, pSKF, pET23D, and fusion expression systems such as GST and LacZ. Epitope tags can also be added to recombinant proteins to provide convenient methods of isolation, e.g., c-myc.

Expression vectors containing regulatory elements from eukaryotic viruses are typically used in eukaryotic expression vectors, e.g., SV40 vectors, papilloma virus vectors, and vectors derived from Epstein-Barr virus. Other exemplary eukaryotic vectors include pMSG, pAV009/A+, pMTO10/A+, pMAMneo-5, baculovirus pDSVE, and any other vector allowing expression of proteins under the direction of the SV40 early promoter, SV40 later promoter, metallothionein promoter, murine mammary tumor virus promoter, Rous sarcoma virus promoter, polyhedrin promoter, or other promoters shown effective for expression in eukaryotic cells.

Some expression systems have markers that provide gene amplification such as thymidine kinase, hygromycin B phosphotransferase, and dihydrofolate reductase. Alternatively, high yield expression systems not involving gene amplification are also suitable, such as a baculovirus vector in insect cells, with a polynucleotide sequence encoding the chimeric polypeptide under the direction of the polyhedrin promoter or other strong baculovirus promoters.

The elements that are typically included in expression vectors also include a replicon that functions in *E. coli*, a gene encoding antibiotic resistance to permit selection of bacteria that harbor recombinant plasmids, and unique restriction sites in nonessential regions of the plasmid to allow insertion of eukaryotic sequences. The particular antibiotic resistance gene chosen is not critical, any of the many resistance genes known in the art are suitable. The prokaryotic sequences are optionally chosen such that they do not interfere with the replication of the DNA in eukaryotic cells, if necessary. Similar to antibiotic resistance selection markers, metabolic selection markers based on known metabolic pathways may also be used as a means for selecting transformed host cells.

When periplasmic expression of a recombinant protein (e.g., a chimeric ectolysin polypeptide of the present invention) is desired, the expression vector further comprises a sequence encoding a secretion signal, such as the *E. coli* OppA (Periplasmic Oligopeptide Binding Protein) secretion signal or a modified version thereof, which is directly connected to 5' of the coding sequence of the protein to be expressed. This signal sequence directs the recombinant protein produced in cytoplasm through the cell membrane into the periplasmic space. The expression vector may further comprise a coding sequence for signal peptidase 1, which is capable of enzymatically cleaving the signal sequence when the recombinant protein is entering the periplasmic space. More detailed description for periplasmic production of a recombinant protein can be found in, e.g., Gray et al., *Gene* 39: 247-254 (1985), U.S. Pat. Nos. 6,160,089 and 6,436,674.

B. Transfection Methods

Standard transfection methods are used to produce bacterial, mammalian, yeast, insect, or plant cell lines that express large quantities of a recombinant polypeptide, which are then purified using standard techniques (see, e.g., Colley et al., *J. Biol. Chem.* 264: 17619-17622 (1989); *Guide to Protein Purification*, in *Methods in Enzymology*, vol. 182 (Deutscher, ed., 1990)). Transformation of eukaryotic and prokaryotic cells are performed according to standard techniques (see, e.g., Morrison, *J. Bact.* 132: 349-351 (1977); Clark-Curtiss & Curtiss, *Methods in Enzymology* 101: 347-362 (Wu et al., eds, 1983).

Any of the well-known procedures for introducing foreign nucleotide sequences into host cells may be used. These include the use of calcium phosphate transfection, polybrene, protoplast fusion, electroporation, liposomes, microinjection, plasma vectors, viral vectors and any of the other well-known methods for introducing cloned genomic DNA, cDNA, synthetic DNA, or other foreign genetic material into a host cell (see, e.g., Sambrook and Russell, supra). It is only necessary that the particular genetic engineering procedure used be capable of successfully introducing at least one gene into the host cell capable of expressing the recombinant polypeptide.

C. Detection of Recombinant Expression of Chimeric Ectolysin in Host Cells

After the expression vector is introduced into appropriate host cells, the transfected cells are cultured under conditions favoring expression of the chimeric ectolysin polypeptide. The cells are then screened for the expression of the recombinant polypeptide, which is subsequently recovered from the culture using standard techniques (see, e.g., Scopes, *Protein Purification: Principles and Practice* (1982); U.S. Pat. No. 4,673,641; Ausubel et al., supra; and Sambrook and Russell, supra).

Several general methods for screening gene expression are well known among those skilled in the art. First, gene expression can be detected at the nucleic acid level. A variety of methods of specific DNA and RNA measurement using nucleic acid hybridization techniques are commonly used (e.g., Sambrook and Russell, supra). Some methods involve an electrophoretic separation (e.g., Southern blot for detecting DNA and Northern blot for detecting RNA), but detection of DNA or RNA can be carried out without electrophoresis as well (such as by dot blot). The presence of nucleic acid encoding a chimeric ectolysin polypeptide in transfected cells can also be detected by PCR or RT-PCR using sequence-specific primers.

Second, gene expression can be detected at the polypeptide level. Various immunological assays are routinely used by those skilled in the art to measure the level of a gene product, particularly using polyclonal or monoclonal antibodies that react specifically with a chimeric ectolysin of the present invention (e.g., Harlow and Lane, Antibodies, *A Laboratory Manual*, Chapter 14, Cold Spring Harbor, 1988; Kohler and Milstein, *Nature,* 256: 495-497 (1975)). Such techniques require antibody preparation by selecting antibodies with high specificity against the chimeric ectolysin. The methods of raising polyclonal and monoclonal antibodies are well established and their descriptions can be found in the literature, see, e.g., Harlow and Lane, supra; Kohler and Milstein, Eur. J. *Immunol.,* 6: 511-519 (1976).

D. Purification of Recombinantly Produced Chimeric Ectolysins

Once the expression of a recombinant chimeric ectolysin polypeptide in transfected host cells is confirmed, the host cells are then cultured in an appropriate scale for the purpose of purifying the recombinant polypeptide.

1. Purification of Recombinantly Produced Polypeptide from Bacteria

When the chimeric ectolysin polypeptides of the present invention are produced recombinantly by transformed bacteria in large amounts, typically after promoter induction, although expression can be constitutive, the polypeptides may form insoluble aggregates. There are several protocols that are suitable for purification of protein inclusion bodies. For example, purification of aggregate proteins (hereinafter referred to as inclusion bodies) typically involves the extraction, separation and/or purification of inclusion bodies by disruption of bacterial cells, e.g., by incubation in a buffer of about 100-150 μg/ml lysozyme and 0.1% Nonidet P40, a non-ionic detergent. The cell suspension can be ground using a Polytron grinder (Brinkman Instruments, Westbury, NY). Alternatively, the cells can be sonicated on ice. Alternate methods of lysing bacteria are described in Ausubel et al. and Sambrook and Russell, both supra, and will be apparent to those of skill in the art.

The cell suspension is generally centrifuged and the pellet containing the inclusion bodies resuspended in buffer which does not dissolve but washes the inclusion bodies, e.g., 20 mM Tris-HCl (pH 7.2), 1 mM EDTA, 150 mM NaCl and 2% Triton-X 100, a non-ionic detergent. It may be necessary to repeat the wash step to remove as much cellular debris as possible. The remaining pellet of inclusion bodies may be resuspended in an appropriate buffer (e.g., 20 mM sodium phosphate, pH 6.8, 150 mM NaCl). Other appropriate buffers will be apparent to those of skill in the art.

Following the washing step, the inclusion bodies are solubilized by the addition of a solvent that is both a strong hydrogen acceptor and a strong hydrogen donor (or a combination of solvents each having one of these properties). The proteins that formed the inclusion bodies may then be renatured by dilution or dialysis with a compatible buffer. Suitable solvents include, but are not limited to, urea (from about 4 M to about 8 M), formamide (at least about 80%, volume/volume basis), and guanidine hydrochloride (from about 4 M to about 8 M). Some solvents that are capable of solubilizing aggregate-forming proteins, such as SDS (sodium dodecyl sulfate) and 70% formic acid, may be inappropriate for use in this procedure due to the possibility of irreversible denaturation of the proteins, accompanied by a lack of immunogenicity and/or activity. Although guanidine hydrochloride and similar agents are denaturants, this denaturation is not irreversible and renaturation may occur upon removal (by dialysis, for example) or dilution of the denaturant, allowing re-formation of the immunologically and/or biologically active protein of interest. After solubilization, the protein can be separated from other bacterial proteins by standard separation techniques. For further description of purifying recombinant polypeptides from bacterial inclusion body, see, e.g., Patra et al., *Protein Expression and Purification* 18: 182-190 (2000).

Alternatively, it is possible to purify recombinant polypeptides, e.g., a chimeric ectolysin polypeptide, from bacterial periplasm. Where the recombinant protein is exported into the periplasm of the bacteria, the periplasmic fraction of the bacteria can be isolated by cold osmotic shock in addition to other methods known to those of skill in the art (see e.g., Ausubel et al., supra). To isolate recombinant proteins from the periplasm, the bacterial cells are centrifuged to form a pellet. The pellet is resuspended in a buffer containing 20% sucrose. To lyse the cells, the bacteria are centrifuged and the pellet is resuspended in ice-cold 5 mM $MgSO_4$ and kept in an ice bath for approximately 10 minutes. The cell suspension is centrifuged and the supernatant decanted and saved. The recombinant proteins present in the supernatant can be separated from the host proteins by standard separation techniques well known to those of skill in the art.

2. Standard Protein Separation Techniques for Purification

When a recombinant polypeptide, e.g., a chimeric polypeptide of the present invention, is expressed in host cells in a soluble form, its purification can follow the standard protein purification procedure described below.

i. Solubility Fractionation

Often as an initial step, and if the protein mixture is complex, an initial salt fractionation can separate many of the unwanted host cell proteins (or proteins derived from the cell culture media) from the recombinant protein of interest. The preferred salt is ammonium sulfate. Ammonium sulfate precipitates proteins by effectively reducing the amount of water in the protein mixture. Proteins then precipitate on the basis of their solubility. The more hydrophobic a protein is, the more likely it is to precipitate at lower ammonium sulfate concentrations. A typical protocol is to add saturated ammonium sulfate to a protein solution so that the resultant ammonium sulfate concentration is between 20-30%. This will precipitate the most hydrophobic proteins. The precipitate is discarded (unless the protein of interest is hydrophobic) and ammonium sulfate is added to the supernatant to a concentration known to precipitate the protein of interest. The precipitate is then solubilized in buffer and the excess salt removed if necessary, through either dialysis or diafiltration. Other methods that rely on solubility of proteins, such as cold ethanol precipitation, are well known to those of skill in the art and can be used to fractionate complex protein mixtures.

ii. Size Differential Filtration

Based on a calculated molecular weight, a protein of greater and lesser size can be isolated using ultrafiltration through membranes of different pore sizes (for example, Amicon or Millipore membranes). As a first step, the protein mixture is ultrafiltered through a membrane with a pore size that has a lower molecular weight cut-off than the molecular weight of a protein of interest, e.g., a chimeric polypeptide of the present invention. The retentate of the ultrafiltration is then ultrafiltered against a membrane with a molecular cut off greater than the molecular weight of the protein of interest. The recombinant protein will pass through the membrane into the filtrate. The filtrate can then be chromatographed as described below.

iii. Column Chromatography

The proteins of interest (such as a chimeric polypeptide of the present invention) can also be separated from other proteins on the basis of their size, net surface charge, hydrophobicity, or affinity for ligands. In addition, antibodies raised against a chimeric ectolysin can be conjugated to column matrices and the chimeric ectolysin polypeptide immunopurified. All of these methods are well known in the art.

It will be apparent to one of skill that chromatographic techniques can be performed at any scale and using equipment from many different manufacturers (e.g., Pharmacia Biotech).

V. Formulation and Administration

Various applications of the species-specific enzymatic activities can be immediately recognized. One important application is as antibacterial treatment of articles which may be contaminated in normal use. Locations, equipment, environments, or the like where target bacteria may be public health hazards may be treated using such entities. Locations of interest include public health facilities where the purpose or opportunity exists to deal with target bacteria containing materials. These materials may include waste products, e.g., liquid, solid, or air. Aqueous waste treatment plants may incorporate such to eliminate the target from effluent, whether by treatment with the enzyme entities directly, or by release of cells which produce such. Solid waste sites may introduce such to minimize possibility of target host outbreaks. Conversely, food preparation areas or equipment need to be regularly cleaned, and the invention provides compositions and means to effectively eliminate target bacteria. Medical and other public environments subject to contamination may warrant similar means to minimize growth and spread of target microorganisms. The methods may be used in contexts where sterilization elimination of target bacteria is desired, including air filtration systems for an intensive care unit.

Alternative applications include use in a veterinary or medical context. Means to determine the presence of particular bacteria, or to identify specific targets may utilize the effect of selective agents on the population or culture. Inclusion of bacteriostatic or bactericidal activities to cleaning agents, including washing of animals and pets, may be desired.

The chimeric ectolysin polypeptides of this invention can be used to treat infections caused by specific, harmful bacterial species in, e.g., humans or animals, while preserving other species of bacteria that are potentially beneficial. These chimeric polypeptides can be administered prophylactically or can be administered to a subject that has contracted a bacterial infection. In one embodiment, the chimeric polypeptides are used to treat infections (e.g., skin infections) caused by one or more bacteria of a *Staphylococcus* species, such as where *S. aureus* or *S. hominis*, while at the same time have minimal negative impact on other potentially beneficial bacterial species, especially another *Staphylococcus* species such as *S. epidermidis*, that might be present at the same location.

In one embodiment, these chimeric proteins (e.g., any one of SEQ ID NOs:2, 4, 6, and 8) are used to treat humans or other animals that are infected with *S. aureus*. In another embodiment, the chimeric proteins are used to treat humans or other animals that are infected with *S. hominis*. In either case, the growth suppression is specifically targeted toward *S. aureus* or *S. hominis*, but not *S. epidermidis*.

The route of administration and dosage will vary with the infecting bacteria strain(s), the site and extent of infection (e.g., local or systemic), and the subject being treated. The routes of administration include but are not limited to: oral, aerosol or other device for delivery to the lungs, nasal spray, intravenous (IV), intramuscular, intraperitoneal, intrathecal, intraocular, vaginal, rectal, topical, lumbar puncture, intrathecal, and direct application to the brain and/or meninges. Excipients that can be used as a vehicle for the delivery of the therapeutic will be apparent to those skilled in the art. For example, the chimeric ectolysin could be in lyophilized form and be dissolved just prior to administration by IV injection. The dosage of administration is contemplated to be in the range of about 0.03, 0.1, 0.3, 1, 3, 10, 30, 100, 300, 1000, 3000, 10000 or more enzyme molecules per bacterium in the host infection. Depending upon the size of the protein, which may itself be tandemly associated, or in multiple subunit form (dimer, trimer, tetramer, pentamer, and the like) or in combination with one or more other entities, e.g., enzymes or fragments of different specificity, the dose may be about 1 million to about 10 trillion/per kg/per day, and preferably about 1 trillion/per kg/per day.

The therapeutic compositions comprising at least one of the chimeric ectolysins of this invention are typically administered until successful elimination of the target pathogenic bacteria is achieved. Thus the invention contemplates single dosage forms, as well as multiple dosage forms of the compositions of the invention, as well as methods for accomplishing sustained release means for delivery of such single and multi-dosages forms.

With respect to the aerosol administration to the lungs or other mucosal surfaces, the therapeutic composition is incorporated into an aerosol formulation specifically designed for administration. Many such aerosols are known in the art, and the present invention is not limited to any particular formulation. An example of such an aerosol is the Proventil inhaler manufactured by Schering-Plough, the propellant of which contains trichloromonofluoro-methane, dichlorodifluoromethane, and oleic acid. Other embodiments include inhalers that are designed for administration to nasal and sinus passages of a subject or patient. The concentrations of the propellant ingredients and emulsifiers are adjusted if necessary based on the specific composition being used in the treatment.

Methods to evaluate killing capacity of the chimeric ectolysins of this invention are often similar to many methods used in assessing killing capacity of intact replicating phages. Comparing total bacterial counts with viable colony units can establish what fraction of bacteria are actually viable, and by implication, what fraction have been susceptible to the killing constructs. Other means for evaluating stasis activity may include release of intracellular contents, whether natural or loaded, or enzymatic activity on defined or prepared substrates which correspond to natural cell wall structures.

Typically, the killing will decrease bacterial replication capacity to about 1/3 or less, and may affect or reduce it to about 1/10, 1/30, 1/100, 1/300, etc., to many orders of magnitude when compared to a control without exposure to a chimeric ectolysin. However, even slowing the rate of bacterial replication without killing may have significant therapeutic or commercial value. Preferred genetic inactivation efficiencies may be 0.1, 0.2, 0.3, 0.5, 0.8, 1, 1.5, 2.0, 2.5, 3.0, 3.5, 4, 5, 6, 7, 8, or more log units.

This invention further contemplates pharmaceutical compositions comprising at least one chimeric ectolysins described herein and a physiologically or pharmaceutically acceptable excipient. The compositions of the invention thus include formulations comprising an isolated chimeric polypeptide specifically targeting one bacterium, e.g., *S. aureus* or *S. hominis*, but not other closely related species, such as *S. epidermidis*. In some cases, a mixture of two, three, or four of the chimeric polypeptides may be used to enhance the species-specific bacteria killing without significant impact on other non-target bacterial species that may provide potential benefits to a patient. In this manner, the compositions of the invention can be tailored to the needs of the patient. The compounds or compositions will typically be sterile or near sterile.

By "therapeutically effective dose" herein is meant a dose that produces effects, bacteriostatic or preferably bactericidal, for which it is administered. The exact dose will depend on the purpose of the treatment, and will be ascertainable by one skilled in the art using known techniques. See, e.g., Ansel, et al. Pharmaceutical Dosage Forms and Drug Delivery; Lieberman (1992) *Pharmaceutical Dosage Forms* (vols. 1-3), Dekker, ISBN 0824770846, 082476918X, 0824712692, 0824716981; Lloyd (1999) *The Art, Science and Technology of Pharmaceutical Compounding*; and Pickar (1999) *Dosage Calculations*. As is known in the art, adjustments for protein degradation, systemic versus localized delivery, and rate of new protease synthesis, as well as the age, body weight, general health, sex, diet, time of administration, drug interaction, spectrum of bacterial components in the colony, and the severity of the condition may be necessary, and will be ascertainable with some experimentation by those skilled in the art.

Various physiologically or pharmaceutically acceptable excipients are well known in the art. As used herein, "physiologically or pharmaceutically acceptable excipient" refers to a material that, when combined with an active ingredient of a composition, allows the ingredient to retain its biological activity and without causing any detectable physiological reactions in a recipient. Such excipients may include stabilizers, preservatives, salt, or sugar complexes or crystals, and the like.

Exemplary pharmaceutically carriers include sterile aqueous of non-aqueous solutions, suspensions, and emulsions. Examples include, but are not limited to, standard pharmaceutical excipients such as a phosphate buffered saline solution, water, emulsions such as oil/water emulsion, and various types of wetting agents. Examples of non-aqueous solvents are propylene glycol, polyethylene glycol, vegetable oils such as olive oil, and injectable organic esters such as ethyl oleate. Aqueous carriers include water, alcoholic/aqueous solutions, emulsions or suspensions, including saline and buffered media. Parenteral vehicles include sodium chloride solution, Ringer's dextrose, dextrose and sodium chloride, lactated Ringer's or fixed oils. Intravenous vehicles include fluid and nutrient replenishers, electrolyte replenishers (such as those based on Ringer's dextrose), and the like. In other embodiments, the compositions will be incorporated into solid matrix, including slow release particles, glass beads, bandages, inserts on the eye, and topical forms such as creams, pastes, lotions, ointments, liquids or semi-liquids including solutions or suspensions, or incorporated into patches, bandages, or any type of wound dressings.

A composition comprising a chimeric enzyme of the invention may also be lyophilized using means well known in the art, e.g., for subsequent reconstitution and use according to the invention.

Also of interest are formulations for liposomal delivery, and formulations comprising microencapsulated enzymes, including sugar crystals. Compositions comprising such excipients are formulated by well-known conventional methods (see, e.g., *Remington's Pharmaceutical Sciences*, Chapter 43, 14th Ed., Mack Publishing Col, Easton PA 18042, USA).

In general, pharmaceutical compositions can be prepared in various forms, such as granules, tablets, pills, suppositories, capsules (e.g., adapted for oral delivery), microbeads, microspheres, liposomes, suspensions, salves, lotions, and the like. Pharmaceutical grade organic or inorganic carriers and/or diluents suitable for oral and topical use can be used to make up compositions comprising the therapeutically-active compounds. Diluents known to the art include aqueous media, vegetable and animal oils and fats. Formulations may incorporate stabilizing agents, wetting and emulsifying agents, salts for varying the osmotic pressure or buffers for securing an adequate pH value.

VI. KITS

The invention also provides kits for selectively suppressing the growth of certain targeted bacterial species, especially in the presence of other non-targeted bacterial species that might be closely related to the targeted bacterial species (e.g., belonging to the same genus) according to the method of the present invention. The kits typically include a first container that contains a composition including an effective amount of a polypeptide comprising or consisting of an amino acid sequence selected from SEQ ID NOs:2, 4, 6, and 8. The polypeptide is typically present in a composition formulated for topical application, for example, in the form of a cream, paste, lotion, ointment, spray and the like that can be readily applied to a skin surface, or being incorporated into a skin patch, a bandage, or wound dressing for use on a patient's skin.

The kit may optionally include a second container containing a skin care product, such as a moisturizer, a sun screen, or a cosmetic product, such as skin foundation or make-up. Optionally, the kit may further include informational material containing instructions for a user on how to use the kit for performing selective suppression of certain targeted bacterial species.

EXAMPLES

The following examples are provided by way of illustration only and not by way of limitation. Those of skill in the art will readily recognize a variety of non-critical parameters that could be changed or modified to yield essentially similar results.

Example 1: Identification of P158 and P552 for their Selective Anti-Bacterial Activity Methods Construction of a Library of Chimeric Anti-Staphylococcal Lysins A library of different constructs was generated by using PCR-based methods to make chimeric coding sequences. For example, DNA coding sequence for P128 was generated by first fusing the DNA segment coding for 16 kDa orf56 and lysostaphin Sh3b region and then cloning the fusion sequence into a T7 promoter-based *E. coli* expression system. Similarly, P158 was constructed by fusing the 19 kDa orf56 region with the lysostaphin Sh3b domain. Specific mutations to generate different constructs were performed by site-directed mutagenesis using a commercial kit (Agilent technologies). In addition, P128 mutants were also generated by PCR-based random mutagenesis of the fusion coding sequence for P128, shotgun cloning the random mutants into expression vector and screening for the resultant mutants with desired properties.

The sequence of ORF56 of a *Staphylococcus* phage K is set forth in Accession Number YP_024486. The Cysteine-Histidine dependent Aminohydrolase/Peptidase (CHAP) domain within ORF56 corresponds to the segment of amino acid residues 690 to 805. The 16 kDa fragment of ORF56 corresponds to the segment of amino acid residues 669-808, and the 19 kDa fragment of ORF56 corresponds to the segment of amino acid residues 629 to 808.

Different constructs screened for selectivity are listed below in Table 1.

TABLE 1

| Spot # | Construct # | Construct details |
|---|---|---|
| 1 | P128 | 16 kDa ORF56- Lysostaphin Sh3b fusion |
| 2 | P180 | P128 variant (E143D, E161D) |
| 3 | P188 | P128 variant (E143D, E161D, E198D) |
| 4 | P533 | P128 with rigid linker |
| 5 | P552 | P128 variant with mutations (K61E, Q135L, E143D, Y210H) |
| 6 | P563 | P128 with flexible linker (Codon optimized clone) |
| 7 | P023 | L54 amidase |
| 8 | P120 | Lysostaphin |
| 9 | P158 | 19 kDa ORF56- Lysostaphin Sh3b fusion |
| 10 | P187 | P926 Lysin |

Screening of Chimeric Ectolysins for Selectivity

To determine the spectrum of anti-Staphylococcal activity and to evaluate the selectivity and specificity of the ectolysins in the library, the present inventors developed a suitable screening method. Plasmid DNA of different constructs for screening were transformed into an *E. coli* expression strain BL21A1 by heat shock method and plated on LB agar containing appropriate antibiotics and incubated at 37° C. for 18-20 hrs for selection of transformant colonies. These colonies were inoculated into 5 mL LB broth containing appropriate antibiotic and incubated at 37° C. for 6-8 hrs followed by placing 5 μL of each culture as a spot on LB agar containing 0.2% L(+) arabinose and 0.5 mM IPTG, allowed to air dry and incubated at ambient temperature for 18 hrs for protein expression. The plates were then exposed to chloroform vapors for 15 minutes for releasing the expressed protein from the cell and overlaid separately with soft agar containing *S. aureus*, *S. hominis*, and *S. epidermidis* and incubated at 37° C. for 18 hrs. Lysis zone around different spots were visualized to determine selectivity (FIG. 1).

Results and Discussions

As seen in FIG. 1, spots #7 and #10 do not show any lysis zone indicating no detectable activity. Spots #1, 2, 3, 4, and 6 show lysis zones on all three *Staphylococcus* spp. indicating broader activity with no apparent selectivity. However, highlighted spots #5 and #9 corresponding to construct P552 and P158 show lysis zones on *S. aureus* and *S. hominis* and not on *S. epidermidis* indicating selectivity.

While P128 (spot #1) showed lysis zones on all three Staphylococci tested, constructs P158 and P552 did not show lysis zone on *S. epidermidis* but showed lysis zones on both *S. aureus* and *S. hominis*, indicating selectivity in their anti-bacterial activity: *S. aureus* and *S. hominis* are targeted, but not *S. epidermidis*. These two chimeric proteins, P158 and P552, were taken up for further testing.

Example 2: Further Characterization of P552

Construction of P552

P552 is a variant of P128 with 4 mutations: K61E, Q135L, E143D and Y210H. Two of the mutations, K61E and Q135L, reside in the CHAP domain, E143D is in the linker region, and Y210H mutation is in the Sh3b domain. This P128 variant was isolated after a PCR-based random mutagenesis of the P128 coding sequence to screen for mutants that demonstrate higher specific activity and selectivity towards *S. aureus*.

Antibacterial Activity and Selectivity of P552

As seen in FIG. 1, P552 showed lysis zones in *S. aureus* and *S. hominis* and not on *S. epidermidis*. To confirm the selectivity that was observed on screening assay, contact kill and MIC assays with purified P552 were performed on *S. aureus* and *S. epidermidis*.

For contact kill assays, the isolates were grown in Mueller Hinton Broth (MHB) and $10^6$ CFU/mL of both these isolates were mixed with 5 and 10 μg/mL of purified P552 and incubated at 37° C. for 1 hour. Log-kill was estimated by enumerating the residual CFU/mL by dilution plating on LB agar plates. The plates were incubated at 37° C. for 18-24 hrs for bacterial growth.

Results

Figure 2:
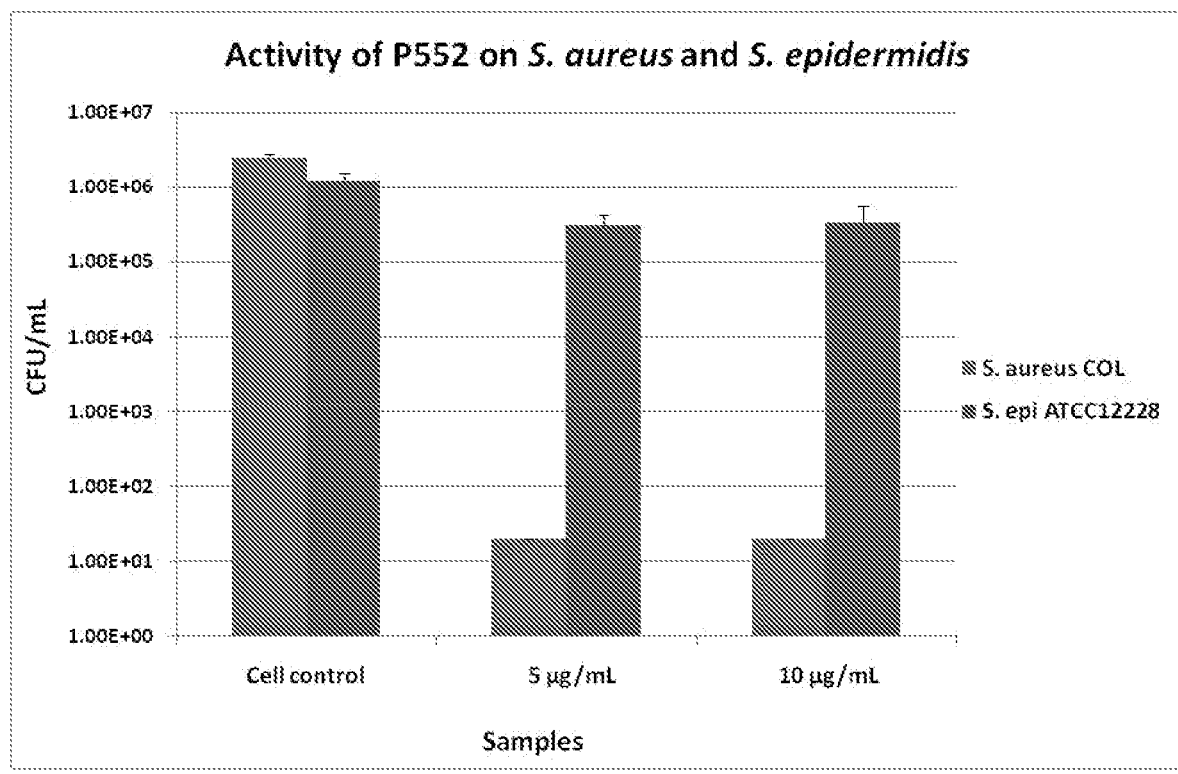
FIG. 2. Selectivity testing by contact kill assay of P552 on *S. aureus* and *S. epidermidis*.

P552 was very potent in killing *S. aureus*. While P552 at 5 μg/mL was sufficient for >4 logs killing of *S. aureus*, P552 at even 10 μg/mL showed <1 log kill of *S. epidermidis* cells (FIG. 2).

In addition to the contact kill assay, a standard MIC assay was done with P552 in MHB media on one strain each of *S. aureus* and *S. epidermidis*. 5×10⁵ cells of these strains were treated with doubling dilutions of purified P552 and incubated at 35° C. for 18-20 hrs. The MIC of P552 on *S. aureus* was 7 µg/mL and on *S. epidermidis* it was >115 µg/mL, the highest concentration tested.

It is therefore demonstrated that P552's antibacterial activity is selective: it has potent activity against *S. aureus* whereas its activity on *S. epidermidis* is poor.

Example 3: Further Characterization of P158

Construction of P158

As described above, construct expressing P158 showed lysis zones on *S. aureus* and *S. hominis* without affecting *S. epidermidis*. P158 is a chimeric fusion of 19 kDa ORF56 with the cell wall binding domain (CBD) of lysostaphin, see "Construct 2" or SEQ ID NO:6 described in WO2007/130655. While the 19 kDa ORF56 region harbors the catalytic Cysteine Histidine-dependent aminohydrolase/peptidase (CHAP) domain, the CBD of lysostaphin harbor the Sh3b domain.

This chimeric fusion was cloned in an *E. coli* expression vector, induced with IPTG, and the chimeric protein of 30.3 kDa was purified to homogeneity using ion-exchange chromatography.

Testing for Selectivity of P158

The antibacterial activity and selectivity of purified P158 was determined by a contact kill assay on one strain of *S. hominis* and 3 strains of *S. epidermidis*. These 4 isolates were grown in Mueller Hinton Broth (MHB) and 10⁶ CFU/mL of each of these isolates were mixed with 10 µg/mL of purified P158 and incubated at 37° C. for 2 hours. Log-kill was estimated by dilution plating on LB agar plates to enumerate residual cells. The plates were incubated at 37° C. for 18-24 hrs for bacterial growth. The cell controls at the beginning of the experiment (CC-0 hr) and at the end of 2 hrs of incubation (CC-2 hrs) were also enumerated.

Results

Figure 3:
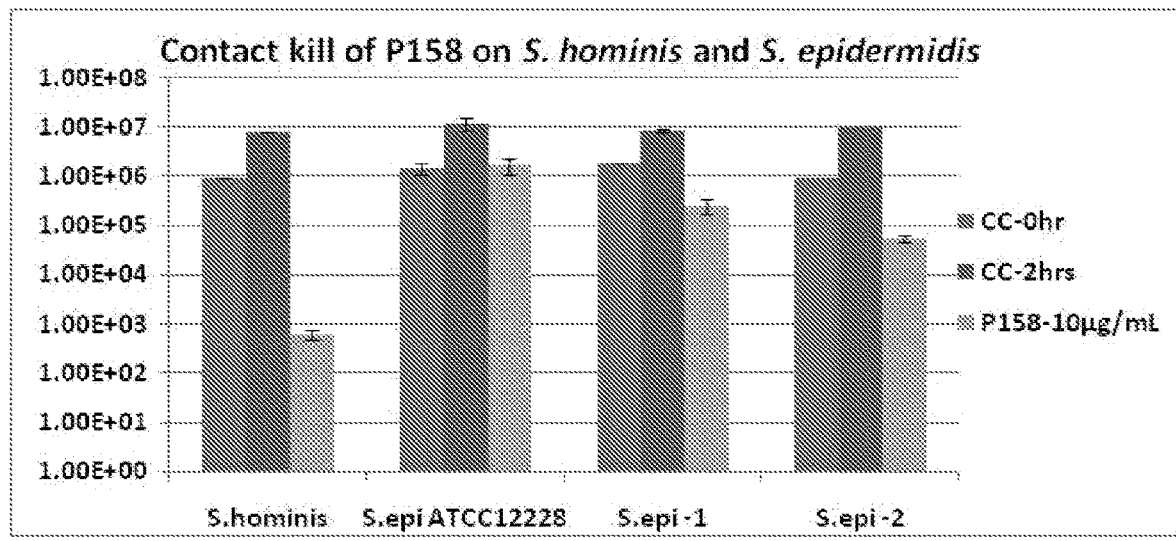
FIG. 3. Selectivity testing by contact kill assay of P158 on *S. hominis* and *S. epidermidis*.

While P158 killed *S. hominis* efficiently with >3 logs cell killing at 10 µg/ml of the protein, its activity on *S. epidermidis* strains was weak with ~1 log kill at the same concentration (FIG. 3). It is therefore demonstrated that P158 kills *S. hominis* very efficiently without significantly affecting *S. epidermidis*, indicating its utility for selectively killing *S. hominis*.

Example 4: Further Characterization of P158 Variant P751

Construction of P751

The N-terminal region of P158 has a series of glycine residues that could potentially serve as substrate for self-cleavage, due to the propensity of CHAP domain towards glycine rich residues. To prevent any potential self-cleavage that could affect protein stability, glycine residues at position 30, 35, and 40 were modified by substitution with alanine. This was done by introducing the required modification in the primer sequences during PCR amplification and re-cloning the chimeric gene. This modified P158 with alanines at position 30, 35, and 40 was cloned into an *E. coli* expression vector, pET26b, to generate P751.

Testing for Selectivity of P751

The antibacterial activity and selectivity of purified P751 was determined by a contact kill assay on one strain each of *S. aureus* and *S. epidermidis*. The isolates were grown in Mueller Hinton Broth (MHB) for 4-5 hrs and 10⁶ CFU/mL of each of them were mixed with 5 and 10 µg/mL of purified P751 and incubated at 37° C. for 1 hour. Log-kill was estimated by enumerating the residual CFU/mL by dilution plating on LB agar plates. The plates were incubated at 37° C. for 18-24 hrs for bacterial growth.

Results

Figure 4:
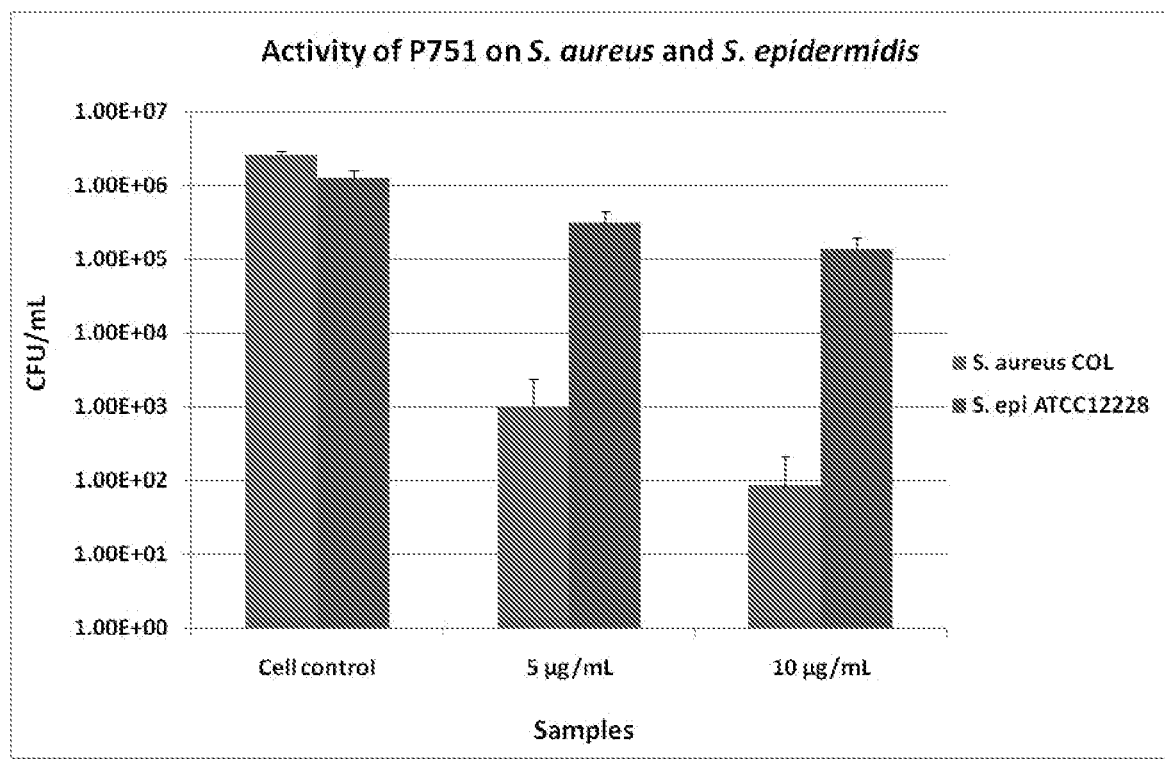
FIG. 4. Selectivity testing by contact kill assay of P751 on *S. aureus* and *S. epidermidis*.

Bactericidal activity was observed on *S. aureus* with 5 µg/mL giving 3 logs kill and 10 µg/mL of P751 giving 4 logs cell killing. However, on *S. epidermidis* only one log killing was obtained even with 10 µg/mL (FIG. 4). It is therefore demonstrated that P751 is able to kill *S. aureus* efficiently with minimal effect on *S. epidermidis*.

Example 5: Further Characterization of P158 Variant P752

Construction of P752

The glutamine at position 128 on P751 was modified by substitution with glutamic acid. This was done by using site-directed mutagenesis of P751 construct to generate P752.

Testing for Selectivity of P752

A standard MIC assay according to the CLSI protocol was performed to determine antibacterial activity and selectivity of P752 and it was compared against P158. This assay was performed on one strain each of *S. aureus*, *S. hominis* and *S. epidermidis*.

Results

P752 had very high MIC of 250 µg/mL on *S. epidermidis* and a very good selectivity window between *S. aureus* and *S. hominis* of 0.5 µg/mL and 31 µg/mL respectively. Similarly, P158 showed very high MIC on *S. epidermidis* and 4 fold selectivity between *S. aureus* and *S. hominis* (Table 2). It is therefore demonstrated that P752 is able to kill *S. aureus* efficiently with minimal effect on *S. epidermidis*.

TABLE 2

MIC of P158 and P752 on *S. aureus*, *S. hominis* and *S. epidermidis*.

| Protein ID | *S. aureus* (µg/ml) | *S. hominis* (µg/ml) | *S. epidermidis* (µg/ml) |
|---|---|---|---|
| P158 | 3 | 12.5 | 400 |
| P752 | 0.5 | 31 | 250 |

All patents, patent applications, and other publications, including GenBank Accession Numbers or equivalents, cited in this application are incorporated by reference in the entirety of their contents for all purposes.

```
SEQUENCE LISTING
Amino acid sequence of P128
(taken from WO2007/130655)
                                      SEQ ID NO: 1
MSLDSLKKYNGKLPKHDPSFVQPGNRHYKYQCT

WYAYNRRGQLGIPVPLWGDAADWIGGAKGAGYG

VGRTPKQGACVIWQRGVQGGSPQYGHVAFVEKV
```

-continued

LDGGKKIFISEHNYATPNGYGTRTIDMSSAIGK

NAQFIYDKKLETPNTGWKTNKYGTLYKSESASF

TPNTDIITRTTGPFRSMPQSGVLKAGQTIHYDE

VMKQDGHVWVGYTGNSGQRIYLPVRTWNKSTNT

LGVLWGTIK

Amino acid sequence of P552
(Theoretical pI/Mw: 9.66/26516.02)
SEQ ID NO: 2

MSLDSLKKYNGKLPKHDPSFVQPGNRHYKYQCT

WYAYNRRGQLGIPVPLWGDAADWIGGAEGAGYG

VGRTPKQGACVIWQRGVQGGSPQYGHVAFVEKV

LDGGKKIFISEHNYATPNGYGTRTIDMSSAIGK

NALFIYDKKLDTPNTGWKTNKYGTLYKSESASF

TPNTDIITRTTGPFRSMPQSGVLKAGQTIHYDE

VMKQDGHVWVGHTGNSGQRIYLPVRTWNKSTNT

LGVLWGTIK

DNA sequence of P552
SEQ ID NO: 3
atgtctttag attcacttaa gaagtataac ggcaaacttc ctaagcatga cccaagtttt gtacaacctg gtaaccgaca ttataagtat cagtgtacat ggtatgctta atatagaaga ggtcaattag catacctgt gcctttatgg ggggacgccg ccgactggat aggtggtgct gaaggagcag gttatggcgt aggtagaaca cctaaacaag gtgcttgtgt tatatggcaa agaggagttc aaggaggtag cccacaatat ggtcacgtag cgtttgtaga gaaagtatta gatggaggta aaaaaatatt tatctctgaa cataactatg ctaccccta tggatatggt actagaacga tagatatgag ttcagccata ggtaagaatg cactattcat ttacgataag aaactcgaca cgccgaatac aggttggaaa acaaacaat atggcacact atataaatca gagtcagcta gcttcacacc taatacagat ataataacaa gaacgactgg tccatttaga agcatgccgc agtcaggagt cttaaaagca ggtcaaacaa ttcattatga tgaagtgatg aaacaagacg gccatgtttg ggtaggtcat acaggtaaca gtggccaacg tatttacttg cctgtaagaa catggaataa atctactaat actttaggtg ttctttgggg aactataaag tga -continued Amino acid sequence of P158
(Theoretical pI/Mw: 9.43/30372.02;
Domain boundaries: 1-180 = 19 kDa
ORF56 region; 183-279 = Lysostaphin BD)
SEQ ID NO: 4

MGGLMGEDTSKELKEKGVAEKQSSGDKDGGSDS

GGAQDGGSLDSLKKYNGKLPKHDPSFVQPGNRH

YKYQCTWYAYNRRGQLGIPVPLWGDAADWIGGA

KGAGYGVGRTPKQGACVIWQRGVQGGSPQYGHV

AFVEKVLDGGKKIFISEHNYATPNGYGTRTIDM

SSAIGKNAQFIYDKKLETPNTGWKTNKYGTLYK

SESASFTPNTDIITRTTGPFRSMPQSGVLKAGQ

TIHYDEVMKQDGHVWVGYTGNSGQRIYLPVRTW

NKSTNTLGVLWGTIK

DNA sequence of P158
SEQ ID NO: 5
atgggaggtc ttatgggtga agatacttct aaagaactta agaaaaaggg tgtagcagag aaacaaagta gtggagataa agatggtggt tctgatagtg gtggagctca agatggtggc tctttagatt cacttaaaaa atataacggc aaacttccta agcatgaccc aagttttgtt caacctggta accgacatta taagtatcag tgtacatggt atgcttataa tagaagaggt caattaggca tacctgtgcc tttatggggg gacgccgccg actggatagg tggtgctaaa ggagcaggtt atggtgtagg tagaacacct aaacaaggtg cttgtgttat atggcaaaga ggagttcaag gaggtagccc acaatatggt cacgtagcgt ttgtagagaa agtattagat ggaggtaaaa aaatatttat ctctgaacat aactatgcta cccctaatgg atatggtact agaacgatag atatgagttc agccataggt aagaatgcac aattcattta cgataagaaa ctcgagacgc cgaatacagg ttggaaaaca aacaaatatg gcacactata aaatcagag tcagctagct cacacctaa tacagatata ataacaagaa cgactggtcc atttagaagc atgccgcagt caggagtctt aaaagcaggt caaacaattc attatgatga agtgatgaaa caagacggtc atgtttgggt aggttataca ggtaacagtg gccaacgtat ttacttgcct gtaagaacat ggaataaatc tactaatact ttaggtgttc tttggggaac tataaagtga Amino acid sequence of P751
(Theoretical pI/Mw: 9.43/30414.10;
Domain boundaries: 1-180 = 19 kDa
ORF56 region; 183-279 = Lysostaphin BD)

SEQ ID NO: 6

MGGLMGEDTSKELKEKGVAEKQSSGDKDGASDS

GAAQDGASLDSLKKYNGKLPKHDPSFVQPGNRH

YKYQCTWYAYNRRGQLGIPVPLWGDAADWIGGA

KGAGYGVGRTPKQGACVIWQRGVQGGSPQYGHV

AFVEKVLDGGKKIFISEHNYATPNGYGTRTIDM

SSAIGKNAQFIYDKKLETPNTGWKTNKYGTLYK

SESASFTPNTDIITRTTGPFRSMPQSGVLKAGQ

TIHYDEVMKQDGHVWVGYTGNSGQRIYLPVRTW

NKSTNTLGVLWGTIK

DNA sequence of P751

SEQ ID NO: 7 atgggaggtc ttatgggtga agatacttct aaagaactta agaaaaagg tgtagcagag aaacaaagta gtggagataa agatggtgct tctgatagtg gtgcagctca agatggtgcc tctttagatt cacttaaaaa atataacggc aaacttccta agcatgaccc aagttttgtt caacctggta accgacatta taagtatcag tgtacatggt atgcttataa tagaagaggt caattaggca tacctgtgcc tttatggggg gacgccgccg actggatagg tggtgctaaa ggagcaggtt atggtgtagg tagaacacct aaacaaggtg cttgtgttat atggcaaaga ggagttcaag gaggtagccc acaatatggt cacgtagcgt ttgtagagaa agtattagat ggaggtaaaa aaatatttat ctctgaacat aactatgcta cccctaatgg atatggtact agaacgatag atatgagttc agccataggt aagaatgcac aattcattta cgataagaaa ctcgacacgc cgaatacagg ttggaaaaca aacaaatatg gcacactata taaatcagag tcagctagct tcacacctaa tacagatata ataacaagaa cgactggtcc atttagaagc atgccgcagt caggagtctt aaaagcaggt caaacaattc attatgatga agtgatgaaa caagacggtc atgtttgggt aggttataca ggtaacagtg gccaacgtat ttacttgcct gtaagaacat ggaataaatc tactaatact ttaggtgttc tttggggaac tataaagtga Amino acid sequence of P752
(Theoretical pI/Mw: 9.37/30415.08)

SEQ ID NO: 8

MGGLMGEDTSKELKEKGVAEKQSSGDKDGASDS

GAAQDGASLDSLKKYNGKLPKHDPSFVQPGNRH

YKYQCTWYAYNRRGQLGIPVPLWGDAADWIGGA

KGAGYGVGRTPKQGACVIWQRGVQGGSPEYGHV

AFVEKVLDGGKKIFISEHNYATPNGYGTRTIDM

SSAIGKNAQFIYDKKLETPNTGWKTNKYGTLYK

SESASFTPNTDIITRTTGPFRSMPQSGVLKAGQ

TIHYDEVMKQDGHVWVGYTGNSGQRIYLPVRTW

NKSTNTLGVLWGTIK

DNA sequence of P752

SEQ ID NO: 9 atgggaggtc ttatgggtga agatacttct aaagaactta agaaaaagg tgtagcagag aaacaaagta gtggagataa agatggtgct tctgatagtg gtgcagctca agatggtgcc tctttagatt cacttaaaaa atataacggc aaacttccta agcatgaccc aagttttgtt caacctggta accgacatta taagtatcag tgtacatggt atgcttataa tagaagaggt caattaggca tacctgtgcc tttatggggg gacgccgccg actggatagg tggtgctaaa ggagcaggtt atggtgtagg tagaacacct aaacaaggtg cttgtgttat atggcaaaga ggagttcaag gaggtagccc agagtatggt cacgtagcgt ttgtagagaa agtattagat ggaggtaaaa aaatatttat ctctgaacat aactatgcta cccctaatgg atatggtact agaacgatag atatgagttc agccataggt aagaatgcac aattcattta cgataagaaa ctcgacacgc cgaatacagg ttggaaaaca aacaaatatg gcacactata taaatcagag tcagctagct tcacacctaa tacagatata ataacaagaa cgactggtcc atttagaagc atgccgcagt caggagtctt aaaagcaggt caaacaattc attatgatga agtgatgaaa caagacggtc atgtttgggt aggttataca ggtaacagtg gccaacgtat ttacttgcct gtaagaacat ggaataaatc tactaatact ttaggtgttc tttggggaac tataaagtga

We claim:

1. A polypeptide comprising the amino acid sequence of SEQ ID NO:2, 4, 6, or 8.

2. The polypeptide of claim 1, consisting of the amino acid sequence of SEQ ID NO:2, 6, 4, or 8.

3. The polypeptide of claim 1, comprising the amino acid sequence of SEQ ID NO:2.

4. The polypeptide of claim 1, comprising the amino acid sequence of SEQ ID NO:6.

5. The polypeptide of claim 1, comprising the amino acid sequence of SEQ ID NO:8.

6. A nucleic acid comprising a polynucleotide sequence encoding the polypeptide of claim 1.

7. An expression cassette comprising a polynucleotide sequence encoding the polypeptide of claim 1.

8. A vector comprising the expression cassette of claim 7.

9. A host cell comprising the expression cassette of claim 7.

10. A method of recombinantly producing a polypeptide of claim 1, comprising culturing host cells expressing the polypeptide of claim 1.

11. A composition comprising the polypeptide of claim 1 and a physiologically acceptable excipient.

12. The composition of claim 11, formulated for topical application.

13. A kit for selective suppression of growth of S. aureus or S. hominis but not S. epidermidis, comprising a first container containing a composition comprising an effective amount of the polypeptide of claim 1.

14. The kit of claim 13, wherein the polypeptide consists of the amino acid sequence of SEQ ID NO:2, 4, 6, or 8.

15. The kit of claim 13, wherein the composition is formulated for topical application.

16. The kit of claim 13, further comprising a second container containing a skin care product.

17. The polypeptide of claim 1, comprising the amino acid sequence of SEQ ID NO:4.

* * * * *